United States Patent [19]

Feiner et al.

[11] Patent Number: 5,363,441
[45] Date of Patent: Nov. 8, 1994

[54] TECHNIQUE FOR REDUCING ECHOES IN CONFERENCE COMMUNICATIONS

[75] Inventors: Alexander Feiner, Rumson; Gi-Hong Im, Middletown; Joseph G. Kneuer, Fair Haven; Burton R. Saltzberg, Middletown; Jean-Jacques Werner, Holmdel, all of N.J.

[73] Assignee: AT&T Bell Laboratories, Murray Hill, N.J.

[21] Appl. No.: 195,595

[22] Filed: Feb. 14, 1994

Related U.S. Application Data

[63] Continuation of Ser. No. 999,063, Dec. 31, 1992, abandoned.

[51] Int. Cl.$^5$ .............................................. H04M 3/56
[52] U.S. Cl. .................................. 379/411; 379/410; 379/202; 370/32.1
[58] Field of Search ............... 379/410, 411, 202, 204, 379/206, 203, 205; 370/32, 32.1, 62

[56] References Cited

U.S. PATENT DOCUMENTS

| | | | |
|---|---|---|---|
| 4,456,789 | 6/1984 | Groves et al. | 379/202 |
| 4,600,815 | 7/1986 | Horna | 379/390 |
| 4,635,252 | 1/1987 | Küchler | 370/32.1 X |
| 4,901,308 | 2/1990 | Deschaine | 370/58.1 |
| 4,991,166 | 2/1991 | Julstrom | 370/32.1 |
| 5,027,393 | 6/1991 | Yamamura et al. | 379/410 |
| 5,050,160 | 9/1991 | Fuda | 379/410 X |

FOREIGN PATENT DOCUMENTS

| | | | |
|---|---|---|---|
| 3306995 | 8/1984 | Germany | H04Q 11/04 |
| 3427303 | 1/1986 | Germany | H04Q 11/04 |
| 60-226262 | 11/1985 | Japan | H04Q 3/56 |
| 1029154 | 1/1989 | Japan | H04M 9/08 |

OTHER PUBLICATIONS

Jens Nedergaard et al., "An All-Digital Audioconference System", *1990 International Zurich Seminar on Digital Communications*, Mar. 5-8, 1990, Eth Zurich/-Switzerland, pp. 163-172.

*Primary Examiner*—James L. Dwyer
*Assistant Examiner*—Paul A. Fournier
*Attorney, Agent, or Firm*—David R. Padnes

[57] ABSTRACT

Distortion and instability due to echoes in conference communications is reduced through the use of an echo estimating filter disposed in a conference bridging circuit. This circuit includes a signal combiner which receives information signals from each of the parties in the conference communications and provides an output signal which is a combination of the received information signals and an echo compensation signal. The echo estimating filter provides this echo compensation signal in response to the combiner output signal. Advantageously, the echo estimating filter can be fixed or adaptive. In the latter case, the adaptation can be in response to the received information signals or to training sequences.

13 Claims, 6 Drawing Sheets

TECHNIQUE FOR REDUCING ECHOES IN CONFERENCE COMMUNICATIONS

This application is a continuation of application Ser. No. 07/999,063, filed on Dec. 31, 1992, now abandoned.

TECHNICAL FIELD

The present invention relates to communications systems and, more particularly, to such systems having circuitry for reducing echoes in a conference communications originating from three or more information signal sources.

BACKGROUND OF THE INVENTION

Conferencing is the capability in a communications system of coupling information signals among three or more system subscribers. The information signals are typically voice signals but, with the advent of multimedia communications capabilities, can also be non-voice signals, i.e., data, video, facsimile and the like.

Echoes are a major problem in conferencing circuits. When a large number of circuits are interconnected in a conference call, the cumulative effect of many echo paths severely degrades voice quality and circuit instability can render the communications unintelligible. Prior art solutions to the problem of echoes have either introduced attenuation into each of the circuits or have provided echo cancellation via circuitry disposed in each of the circuits interconnected in the conference call. The former technique limits the maximum number of system users or "conferees" in a conference call while the latter solution to the echo problem is expensive to implement in communications systems. It would, therefore, be desirable if a readily implementable, low-cost echo reduction technique could be provided for conferencing circuitry.

SUMMARY OF THE INVENTION

In accordance with the present invention, echoes in a conference call are reduced through the use of an echo estimating filter which is connected to a signal combiner in a conference bridging circuit. In the disclosed embodiments, the combiner receives the information signals to be conferenced along with an echo compensation signal and provides an output representative of a sum of these signals. The echo estimating filter receives the signal combiner output and provides the echo compensation signal. Advantageously, the echo estimating filter can provide fixed or adaptive echo compensation and, in the latter case, the adaptation can be provided in response to the information signals or to training sequences.

DETAILED DESCRIPTION

Figure 1:
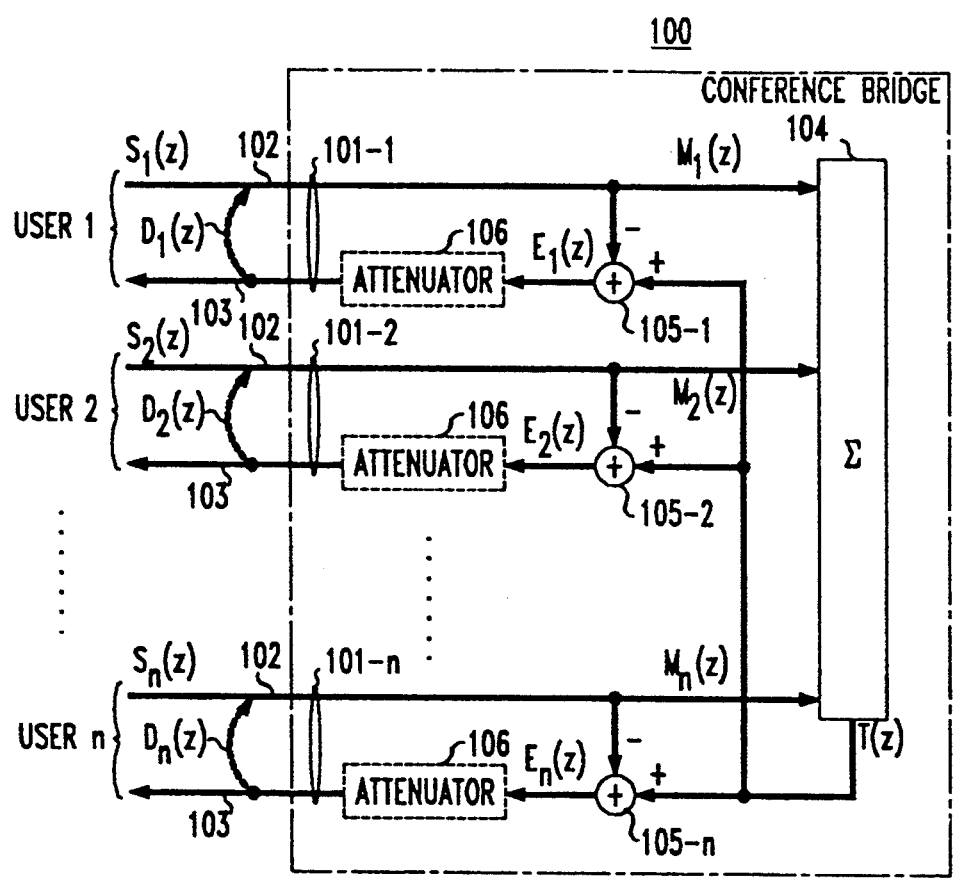
FIG. 1 is a block-schematic diagram of one prior an arrangement for reducing echoes in a conference call.

The present invention will be described relative to the conferencing of voice signals, it being understood, of course, that the present invention is also applicable to the conferencing of non-voice signals. A basic representation of a conference bridge 100 is shown in FIG. 1. Bridge 100 provides illustrative voice conferencing communications capability for n users, where n is a predetermined integer $\geq 3$. This bridge may be disposed in a variety of communication systems including private branch exchanges (PBXs), key telephone systems or the public telephone network. Each of the n users is connected to the conference bridge via one of n communications links 101-1 through 101-n. Each of these links includes an incoming path 102 and an outgoing path 103. Combiner 104 in the bridge unit is connected to each of the n incoming paths 102 and provides an output signal, T(z), to each of the n outgoing paths 103. It shall be assumed that no loss is introduced by the conference bridge. The output signal T(z) is, therefore, equal to the sum of the signals on all n incoming paths 102. A signal subtractor, designated as 105-1 through 105-n, is disposed in each outgoing path 103. Each subtractor subtracts any signal coupled on the incoming path of a link from the composite signal coupled to the outgoing path of that link. As a result, each of the n users hears the speech of all of the other $n-1$ users.

Each of the n links is typically four wires, i.e., it includes a first pair of wires for incoming path 102 and a second pair of wires for outgoing path 103. Each of the n links shown in FIG. 1 and those which follow can be connected to one or more different communication links (not shown) including those referred to as two-wire links, optical fiber links and wireless links.

We shall now assume that the signals coupled to the paths are samples of linearly encoded speech and that all processing is digital at the same sampling rate. We can therefore represent all signals and filters by their z transforms. The signal delivered to the $i^{th}$ port is designated as $E_i(z)$. The signal coupled on the incoming path of this user is designated as $S_i(z)$ but, due to echo coupling, $D_i(z)$, the signal received by bridge unit 100 for this user can be represented by $M_i(z)$ where $$M_i(z) = S_i(z) + D_i(z)E_i(z). \tag{1}$$

The output signal provided by combiner 104 can be represented by $$T(z) = \sum_{k=1}^{n} M_k(z), \tag{2}$$

and the $i^{th}$ output coupled back to the $i^{th}$ user is then formed by subtracting this user's input signal from output signal T(z) to yield $$E_i(z) = T(z) - M_i(z) = \sum_{k \neq i} M_k(z). \tag{3}$$

Manipulating these equations produces the result $$T(z) = \sum_{j=1}^{n} \frac{S_j(z)}{Q(z)[1 + D_j(z)]}, \qquad (4)$$

where $$Q(z) = 1 - \sum_{k=1}^{n} \frac{D_k(z)}{1 + D_k(z)}, \qquad (5)$$

and $$E_i(z) = \sum_{j \neq i} \frac{S_j(z)}{Q(z)[1 + D_i(z)][1 + D_j(z)]} + \qquad (6)$$

$$S_i(z) \frac{1 - Q(z)[1 + D_i(z)]}{Q(z)[1 + D_i(z)]^2}. \quad 15$$

The last term in equation (6) represents an unwanted "sidetone" or echo of a user's own speech caused by echo coupling of that speech through all of the other user's signal paths while the first term in equation (6) is the echo-distorted contribution due to all other users. Stability is primarily determined by the location of zeroes in the quantity Q(z), and the expression for this quantity set forth in equation (5) clearly reveals the effect of echo accumulation.

The problem of echo accumulation can be appreciated by considering the case of n users, each with an identical signal echo $D(z)=az^{-p}$, where $|a|<1$ and p is equal to an integer number of sampling period delays. Then $$Q(z)[1+D(z)]=1-(n-1)az^{-p}, \qquad (7)$$

so that the system becomes unstable if $$|a| \geq \frac{1}{n-1}.$$

This relationship of the allowed value of a to the number of users for system stability demonstrates the sensitivity of a conference bridge to the number of users, even when the amount of echo coupling between the paths of each link is moderate. Equation (6) reduces to $$E_i(z) = \frac{\sum_{j \neq i} S_j(z) + (n-1)az^{-p}S_i(z)}{[1-(n-1)az^{-p}][1+az^{-p}]}. \qquad (8)$$

Equation (8) clearly reveals that even when the system is stable, increasing the number of users in a conference call increases the distortion of the desired signal sum and also the amount of sidetone.

One prior art technique to reduce the problem of echoes is to provide an attenuator in each of the communications paths to reduce the echo coupling by reducing the amplitude of the signal provided to each user. This solution is shown in FIG. 1 by the addition of attenuators 106. The problem with this approach is that it effectively limits the number of users in any conference call. In practical applications this number is approximately 6.

Figure 2:
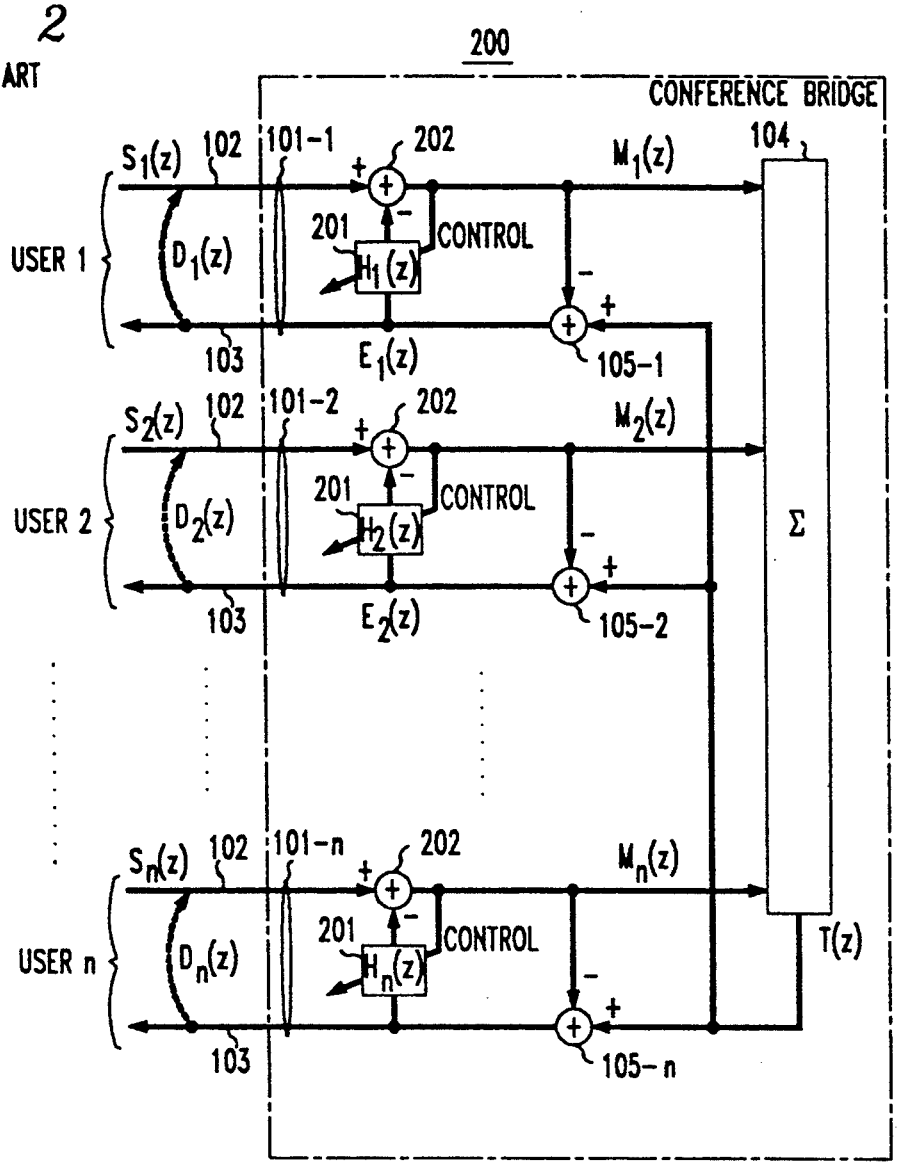
FIG. 2 is a block-schematic diagram of another prior art arrangement for cancelling echoes in a conference call.

Another approach to reducing echoes is to provide an echo estimating filter for each user. FIG. 2 shows this approach by the addition of an echo estimating filter 201 and a signal summer 202 to each of the communications links. Each echo estimating filter is connected between an associated path 103 and associated summer 202 and adapts using the signal $M_i(z)$ to provide a signal to the associated summer which effectively cancels the echo coupled from the associated path 103 and forming part of the positive summer signal input. The z transform of the echo estimating filter for the $i^{th}$ user, where $1 \leq i \leq n$, is designated as $H_i(z)$. Referring to FIG. 2, it can be said that echo estimating filter 201 effectively cancels the echo propagating from left to right on path 102. As a result, after convergence of each echo estimating filter, $$M_i(z)=S_i(z), \qquad (9)$$

and $$E_i(z) = \sum_{k \neq i} S_k(z), \qquad (10)$$

as desired. While the technique shown in FIG. 2 substantially eliminates the problem of echoes, an echo estimating filter is required for each user. Since this device is rather complex and expensive, the implementation of conferencing capability for a large number of users oftentimes exceeds system objectives.

Figure 3:
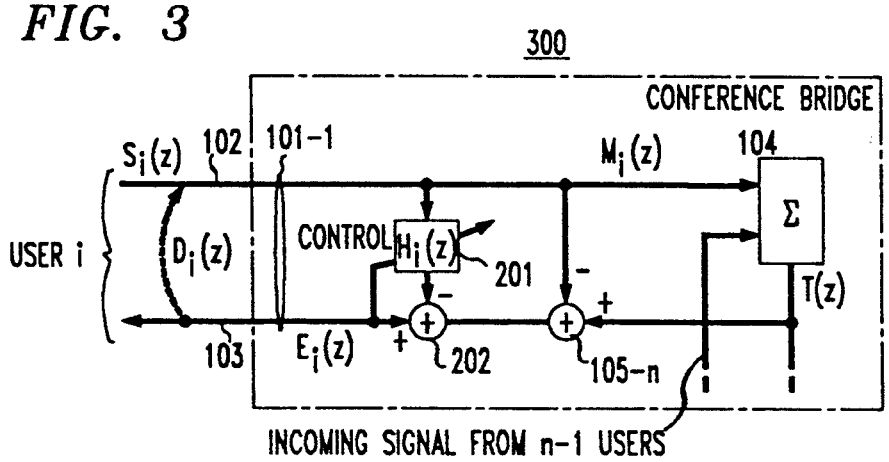
FIG. 3 is a block-schematic diagram of a conference bridge which illustrates the principles of the present invention.

It has been recognized that it is possible to reconfigure the arrangement of FIG. 2 so that each echo estimating filter cancels the echo propagating from right to left on an associated path 103. This reconfiguration for one of the n conferenced parties, designated as user i, is shown in FIG. 3. In the arrangement of FIG. 3, each user's echo estimating filter cancels the echo present in the output signal T provided by signal combiner 104. This arrangement, however, suffers from the same shortcoming of FIG. 2. In addition, the echo present in output signal T(z) is a composite echo of echo coupling from all users' paths and changes as a user is added or dropped from a conference call. As a result of the composite nature of the echo to be cancelled in FIG. 3, the echo is much larger and the required echo estimating filter is a more complex structure. Moreover, since this composite echo changes as a user is added or dropped from a conference call, each echo estimating filter must be readapted each time either event occurs. However, the echo to be cancelled at each port includes the composite of all echoes due to all other user paths. Therefore, particularly for a large number of users, all per-user echo estimating filters will adapt to similar transfer functions, differing only in that each transfer function does not include the echo coupled between its associated incoming and outgoing paths. If we ignore this difference, all echo estimating filters could be replaced by a single echo estimating filter. This is the broad notion underlying the present invention and an arrangement incorporating this notion is shown in FIG. 4.

Figure 4:
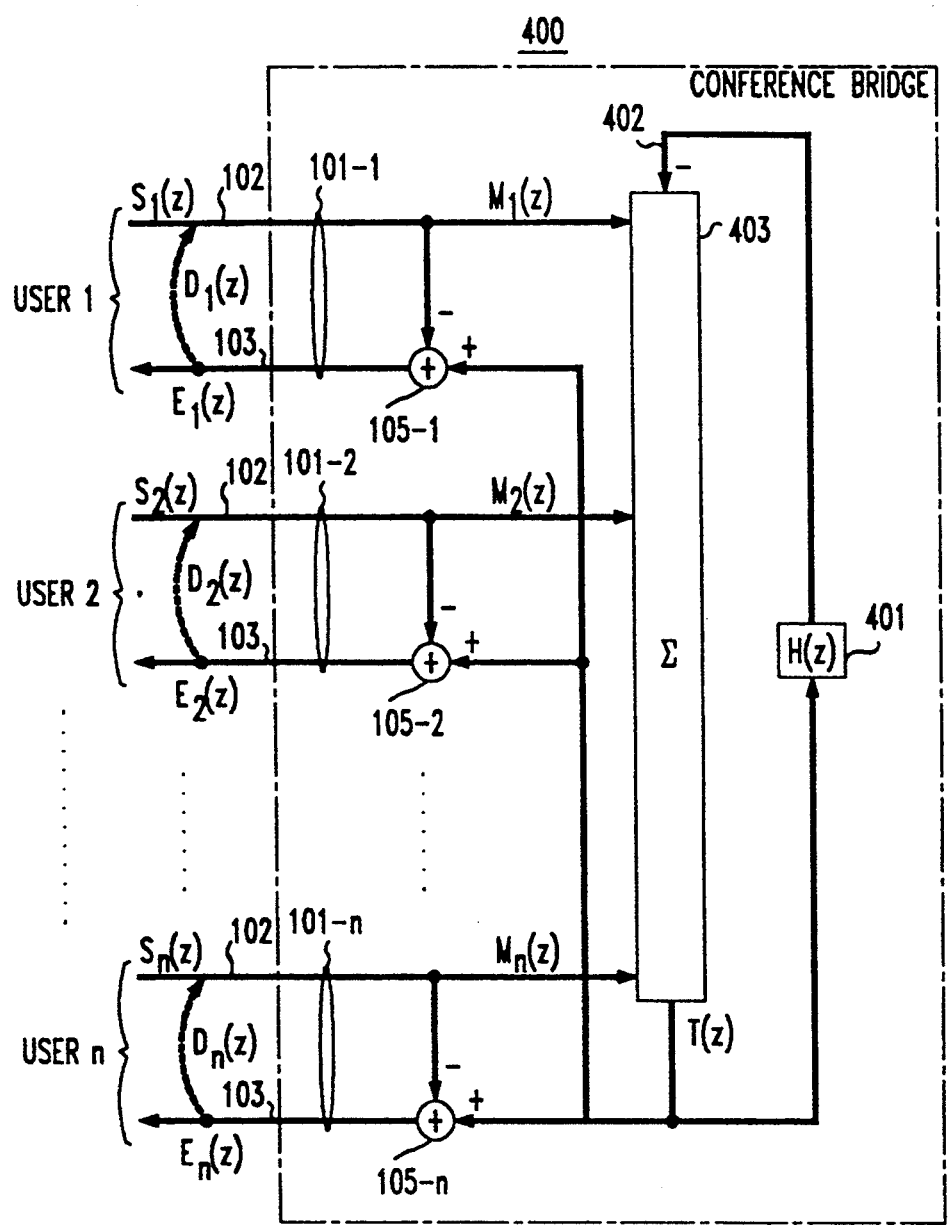
FIG. 4 is a block-schematic diagram of a first embodiment of the present invention utilizing a fixed echo estimating filter.

Referring to FIG. 4, nonadaptive echo estimating filter 401, having z transform H(z), is supplied with the combiner output signal T(z) as an input and supplies its output to an additional combiner input path 402. This echo estimating filter provides a predetermined fixed amount of echo cancellation. Signal combiner 403 utilizes this fixed amount of echo cancellation by subtracting the signal on combiner input path 402 from the sum of the signals coupled on the n incoming paths 102. As will be shown, the use of the term echo "estimating filter" for such a structure in the arrangement of FIG. 4 is really a misnomer as the echo estimating filter 401 will not cancel all echoes but will substantially reduce them and, as a result, more precisely serves as an echo "reducing filter". Based on the previously presented equations, it can be shown that $$T(z) = \sum_{k=1}^{n} \frac{S_k(z)}{1 + D_k(z)} + T(z) \sum_{k=1}^{n} \frac{D_k(z)}{1 + D_k(z)} - H(z)T(z). \quad (11)$$

If we could set $$H(z) = \sum_{k=1}^{n} \frac{D_k(z)}{1 + D_k(z)}, \quad (12)$$

then $$T(z) = \sum_{k=1}^{n} \frac{S_k(z)}{1 + D_k(z)}, \quad (13)$$

and $$E_i(z) = \sum_{j \neq i} \frac{S_j(z)}{[1 + D_j(z)][1 + D_i(z)]} - \frac{D_i(z)S_i(z)}{[1 + D_i(z)]^2}. \quad (14)$$

Comparing equations (14) and (6), it can be seen that the distortion and the sidetone no longer grow with the number of users. Nor is there any stability problem when the individual echo functions are each stable. To examine the residual echo effects, we can again look at the case of all echo coupling being represented by $D(z) = az^{-p}$ where $|a| < 1$ and p is equal to an integer number of sampling period delays. Then $$E_i(z) = \frac{\sum_{j \neq i} S_j(z) - az^{-p}S_i(z)}{[1 + az^{-p}]^2}. \quad (15)$$

Unlike equation (8) there is no growth in any of the distorting factors as the number of users grow. The conferencing arrangement will also be stable even when $$|a| \geq \frac{1}{n-1}.$$

Figure 5:
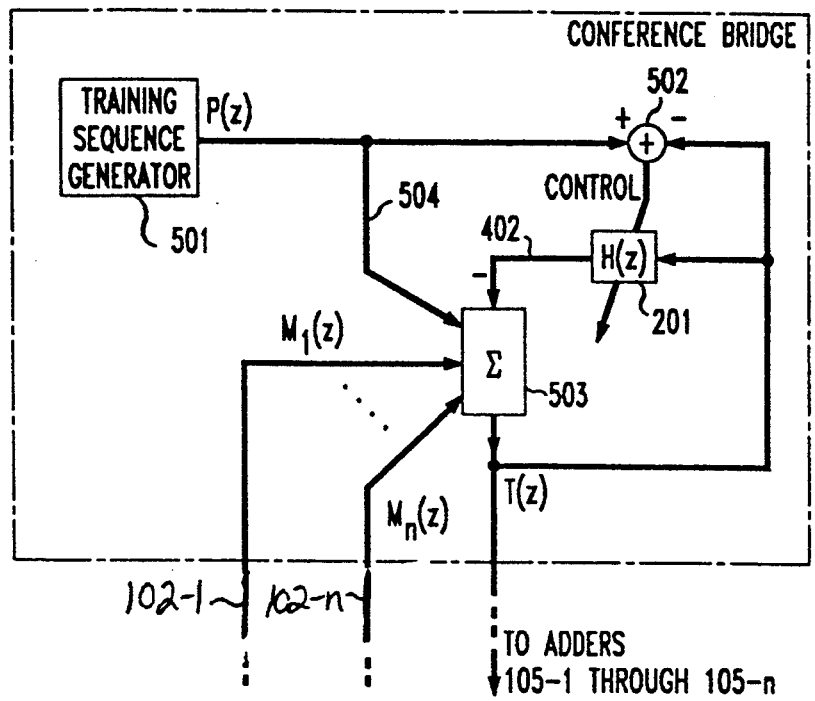
FIG. 5 is a block-schematic diagram of a second embodiment of the present invention utilizing an adaptive echo estimating filter.

While the arrangement of FIG. 4 may provide satisfactory echo reduction in certain conferencing applications, it is often times preferable to utilize an adaptive echo cancellation device which tracks variations in the amount of echo cancellation required. FIG. 5 shows an arrangement wherein adaptive echo estimating filter 201, identical in structure to that shown in FIG. 2 and, therefore, designated by the same reference numerals, is disposed in lieu of the fixed echo estimating filter 401. Echo canceller 201 is adaptive using well-known training sequence techniques wherein each sequence includes a plurality of a priori known signals. Each sequence is transmitted at predetermined times, e.g., at system start-up and at predetermined times thereafter. At each such time, only the training sequence is transmitted. Accordingly, these time intervals must be "reserved in advance" so as to assure the absence of signals transmitted by any of the n users. As shown in FIG. 5, training sequence generator 501 provides a training sequence whose z transform is designated as P(z) at each predetermined time. Adder 502 provides a control signal equal to the algebraic difference between P(z) and T(z). This control signal varies the coefficients of echo estimating filter 201 in well-known fashion and thereby varies the amount of echo cancellation provided by filter 201. Signal combiner 503 provides the same function as signal combiner 403 in FIG. 4 and, in addition, receives the training sequence at each predetermined time via input link 504. Except for the above-described substitution of an adaptive echo estimating filter for a fixed echo estimating filter, the embodiment of FIG. 5 operates in the same manner as that described for FIG. 4.

Figure 6:
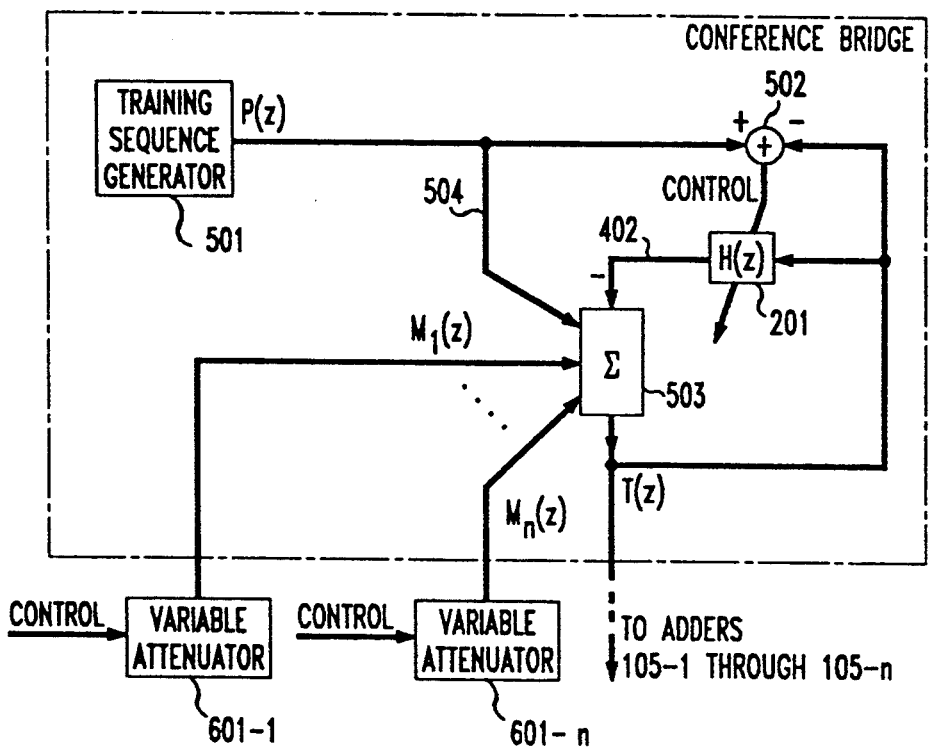
FIGS. 6 and 7 are variations of the embodiment shown in FIG. 5.
Figure 7:
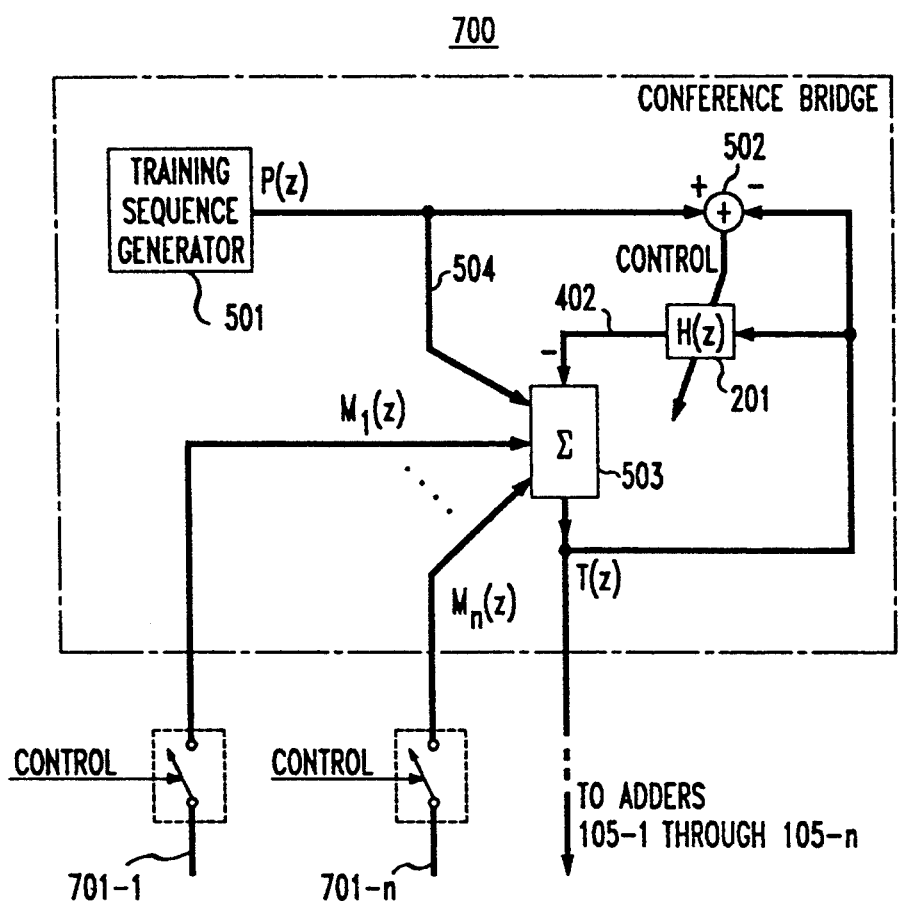

In certain applications, there may be instability in the conference circuit which precludes proper adaptation of echo estimating filter 201 in FIG. 5. To overcome this problem, the arrangements shown in FIGS. 6 and 7 may be utilized. In FIG. 6 which is identical, variable attenuators 601-1 through 601-n are respectively disposed in the incoming paths 102 in each of the n communications links 101-1 through 101-n. Otherwise, the arrangement of FIG. 6 is identical to that shown in FIG. 5. Each of these attenuators provides the same amount of attenuation during the transmission of a training sequence. Initially, each attenuator provides some predetermined amount of attenuation. This predetermined amount of attenuation is then gradually decreased during the training sequence interval. The amount of attenuation provided by each attenuator during the training sequence interval is controlled via a common control signal. Alternatively, as shown in FIG. 7, switches 701-1 through 701-n can be used in lieu of attenuators 601-1 through 601-m. The remaining circuitry in FIG. 7 is identical to that shown in FIG. 5. In the arrangement of FIG. 7, all of these switches, except for one, are open at the commencement of a training sequence interval. During the training sequence interval, the n−1 open switches are successively closed. Operation of each switch is governed via a control signal.

With any of the arrangements shown in FIGS. 5-7, the echo estimating filter is noncontinuously adapted only during training sequence transmission. As a result, in the time periods between training sequence intervals, the amount of echo cancellation required may change due to a variety of factors, such as the addition or deletion in the number of users in the conference call and/or variations in the electrical characteristics of the communications paths being conferenced together. Therefore, it is often desirable to provide continuous adaptation of the echo estimating filter. This capability can be accomplished with the arrangement shown in FIG. 8.

Figure 8:
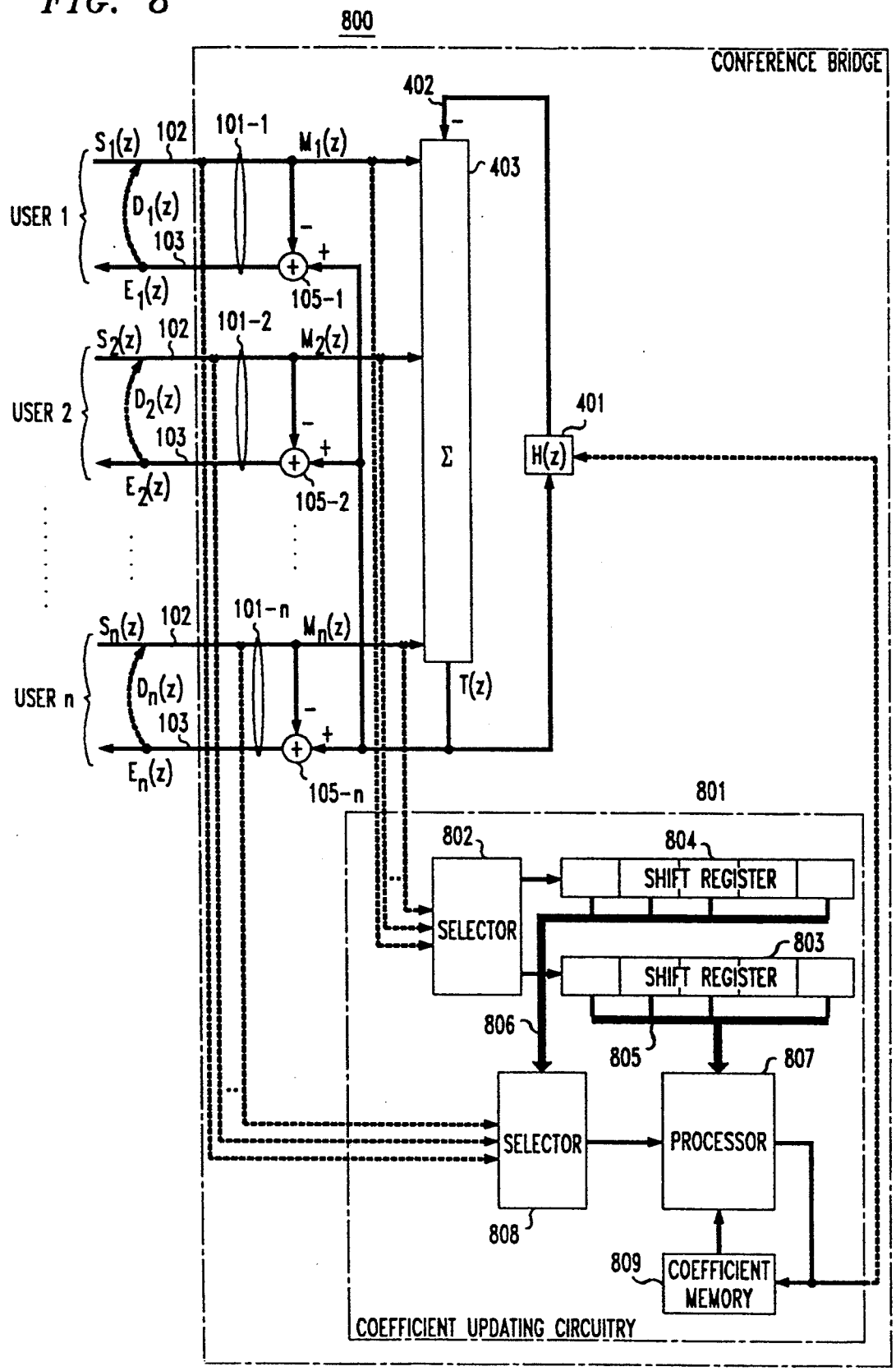
FIG. 8 is a third embodiment of the present invention utilizing an adaptive echo estimating filter.

In FIG. 8, each of the coefficients of the echo estimating filter 401 is updated with every output T(z) sample provided by signal combiner 403. The coefficients are, therefore, updated at the rate of the incoming signal samples on the incoming paths 102 associated with each of the N users. As one or more of these coefficients change, so does the z transform, H(z), of the echo estimating filter.

It is assumed that echo estimating filter 401 has an ordered sequence of M coefficients, where M is a predetermined integer. Any one of these coefficients will be designated as $h_m{}^q$, where m is an index representative of the position of the coefficient in the sequence and $1 \leq m \leq M$, and q is an index representative of the designated coefficient at any of the sampling intervals associated with the successive incoming signal samples on any of the N incoming paths 102. Pursuant to this embodiment of the invention, any echo estimating filter coefficient $h_m$, at sampling time $q+1$, i.e., $h_m{}^{q+1}$ can be expressed as $$h_m{}^{q+1} = h_m{}^q - A \times e^q{}_{[i_{max}{}^{q-m}]} \times m_{max}{}^{q-m} \qquad (16)$$

where $h_m{}^1$ is the value of this coefficient in the immediately preceding sampling time, A is a predetermined scalar commonly referred to as the tap update rate constant, and $m_{max}{}^{q-m}$ is the maximum one of the incoming signal at sampling time $q-m$ on any of the incoming paths 102 for each of the n users and $e^q{}_{[i_{max}{}^{q-m}]}$ is the signal supplied at the qth sampling time to the user associated with $M_{max}$ at sampling time $q-m$. It can be seen that the effect of equation (16) is to uncorrelate the terms $e^q{}_{[i_{max}{}^{q-m}]}$ and $m_{max}{}^{q-m}$. As a result, if at every sampling time there is only one conferee speaking, then this embodiment will eliminate the coupling of an echo of the speaking conferee back to that conferee and will provide each of the non-speaking conferees with an echo-free signal sample of the speaking conferee.

As shown in FIG. 8, the m coefficients of echo estimating filter 201 in conference bridge 800 are updated via coefficients supplied by coefficient updating circuit 801. Circuit 801 includes selector 802 which receives the signal samples on each of the incoming paths 102 and selects the maximum signal sample value every sampling interval and determines the index i of the user associated with each selected maximum signal sample value. The selected maximum signal sample values and associated indices i are successively coupled to shift registers 803 and 804, respectively. Each of these shift register contain M cells and the successive inputs to each of these registers are shifted through the register cells at the incoming signal sample rate. Buses 805 and 806 respectively provide the stored values in registers 803 and 804 to processor 807 and selector 808 each sampling interval. Processor 807 determines each of the coefficients in accordance with equation (16). The term $e^q{}_{[i_{max}{}^{q-m}]}$, i.e., the signal returned on path 103 in the any qth sampling interval for the user associated with the maximum selected signal sample value in m sampling intervals prior to the qth sampling interval, is provided via selector 808. This selector receives each of the signals on paths 103 and selects each of the indices i. For each of the indices i, selector 808 selects the signal on path 103 corresponding to this index and provides each selected signal to the processor. The coefficient values determined by processor 807 are stored in coefficient memory 809 and thence coupled back to the processor for use in accordance with equation (16). It should be noted that the processor could provide the M updated coefficients every sampling interval or could successively provide a different coefficient update every sampling interval. The former operation requires a single processor to operate at M times the signal sample rate while the latter requires processor operation at the signal sample rate but requires M sampling intervals to update the echo estimating filter coefficients. This latter mode of operation may be suitable in applications where the echo cancellation required changes slowly relative to the incoming signal sample rate.

It should, of course, be noted that while the present invention has been described in terms of an illustrative embodiment, other arrangements will be apparent to those of ordinary skill in the art. First, for example, if stability is a problem in the embodiment shown in FIG. 8, the attenuators or switches as shown in FIGS. 6 and 7 could be combined with the circuitry shown in FIG. 8. Second, while the disclosed embodiments utilize discrete devices, the devices can be implemented using one or more appropriately programmed, general-purpose processors or special-purpose integrated circuits or digital processors or an analog or hybrid counterpart of any of these devices. Third, while in the disclosed embodiments, signals samples of the users are digitally processed, the present invention could be implemented without signal sampling through the use of a conference bridge circuit having analog components. Finally, while the signal samples in the disclosed embodiments are all formed at a common sampling rate, well-known digital techniques can be utilized to permit the utilization of signal samples formed at different sampling rates.

We claim:

1. Apparatus for providing conferencing communications comprising
   means for forming a signal sum equal to a sum of signals received from at least three information signal sources along with an echo compensation signal, the signal received from each information source including echoes and said signal sum including an aggregation of such echoes; and
   an echo estimating filter having an input and an output, said input being solely responsive to said signal sum and said output being only coupled to said forming means, said filter forming said echo compensation signal which is an estimate of said aggregation of echoes.

2. The apparatus of claim 1 further including means for providing a signal back to each of said signal sources, the signal returned to each source being equal to said signal sum minus the signal received from that source.

3. The apparatus of claim 1 further including variable attenuators, each attenuator attenuating the signal coupled between a different one of the information signal sources and said foraging means.

4. The apparatus of claim 1 further including switch means disposed between each of the information signal sources and said forming means.

5. The apparatus of claim 1 wherein said echo estimating filter is a fixed filter.

6. The apparatus of claim 1 wherein said echo estimating filter is an adaptive filter.

7. The apparatus of claim 6 further including a training sequence generator and wherein said echo estimating filter has coefficients whose respective values are varied in response to a training sequence comprising a plurality of a priori known values supplied by said training sequence generator.

8. The apparatus of claim 6 wherein said echo estimating filter has a plurality of coefficients whose values are varied at predetermined times and which remain fixed at other times during which signals from said information signal sources are coupled to said forming means.

9. The apparatus of claim 6 wherein said echo estimating filter has a plurality of coefficients whose values are varied in response to processing of said signals from said plurality of information signal sources.

10. The apparatus of claim 9 further including means for varying the values of said coefficients as a function of the maximum one of the signals received from said plurality of signal sources at each of a plurality of times.

11. The apparatus of claim 10 wherein said function is also a function of a signal returned to the signal source supplying the maximum one of the signals received at each of said plurality of received times.

12. A method of reducing echoes in conferencing communications comprising the steps of forming a signal sum equal to a sum of signals received from at least three information signal sources along with an echo compensation signal, the signal received from each information signal source including echoes and said signal sum including an aggregation of such echoes, and forming said echo compensation signal using a filter whose input is solely responsive to said signal sum and whose output is only used in said forming step.

13. Apparatus for providing conferencing capabilities for a at least three conferees, each conferee capable of transmitting information via a transmit link and receiving information via a receive link, said apparatus comprising means for summing signals on said transmit link for each conferee along with an echo compensation signal to provide a signal sum which is coupled to each receive link;

a filter for generating said echo compensation signal in response to said signal sum; and a subtracter associated with each conferee for subtracting the signal on each said transmit link from said signal sum.

* * * * *